(12) United States Patent
Coates et al.

(10) Patent No.: US 9,151,040 B2
(45) Date of Patent: Oct. 6, 2015

(54) TAPE MATERIAL AND ROLL COMPRISING PRESSURE SENSITIVE ADHESIVE

(75) Inventors: Michael William Coates, Glen Iris (AU); Philip John Gibbons, Hughesdale (AU)

(73) Assignee: Zephyros, Inc., Romeo, MI (US)

( * ) Notice: Subject to any disclaimer, the term of this patent is extended or adjusted under 35 U.S.C. 154(b) by 987 days.

(21) Appl. No.: 13/124,644

(22) PCT Filed: Oct. 16, 2009

(86) PCT No.: PCT/AU2009/001365
§ 371 (c)(1),
(2), (4) Date: Nov. 22, 2011

(87) PCT Pub. No.: WO2010/042995
PCT Pub. Date: Apr. 22, 2010

(65) Prior Publication Data
US 2012/0058289 A1    Mar. 8, 2012

Related U.S. Application Data

(60) Provisional application No. 61/106,113, filed on Oct. 16, 2008, provisional application No. 61/106,488, filed on Oct. 17, 2008.

(51) Int. Cl.
*E04B 1/84* (2006.01)
*B32B 5/26* (2006.01)
(Continued)

(52) U.S. Cl.
CPC ... *E04B 1/84* (2013.01); *B32B 5/26* (2013.01); *C09J 7/045* (2013.01); *D04H 13/007* (2013.01);
(Continued)

(58) Field of Classification Search
CPC ...... B32B 5/26; D04H 13/007; G10K 11/168; E04B 1/84; E04B 2001/742; E04B 2001/7687; B60R 13/0815; Y10T 428/24851; Y10T 428/1476; Y10T 428/14; Y10T 428/1462; Y10T 428/149; Y10T 428/15; Y10T 156/1052; Y10T 156/10
USPC ............................................. 428/40.1
See application file for complete search history.

(56) References Cited

U.S. PATENT DOCUMENTS

| 3,214,323 | A | | 10/1965 | Russell et al. | |
| 3,523,859 | A | * | 8/1970 | Komp | ............ 428/195.1 |

(Continued)

FOREIGN PATENT DOCUMENTS

| DE | 6930307 | 12/1969 |
| DE | 19714348 | 2/2008 |

(Continued)

OTHER PUBLICATIONS

DECI-TEX 3D, URL =http://web.archive.org/web/20070830042658/http://www.inccorp.com.au/page/deci_tex_3d. html#top, including nine documents from links therein, download date Aug. 26, 2011, 19 pages.

(Continued)

*Primary Examiner* — Patricia L Nordmeyer
(74) *Attorney, Agent, or Firm* — The Dobrusin Law Firm, P.C.

(57) ABSTRACT

A tape material comprising: a thin flexible substrate; and a pressure sensitive adhesive (PSA) substance carried on a single side of the substrate, the PSA substance being provided in an intermittent pattern along a length of the substrate.

14 Claims, 5 Drawing Sheets

Mesh reinforcement — Intermittent patterned PSA coating — Release Liner with slits (51) Int. Cl.
  *D04H 13/00* (2006.01)
  *G10K 11/168* (2006.01)
  *C09J 7/04* (2006.01)
  *B60R 13/08* (2006.01)
  *E04B 1/74* (2006.01)
  *E04B 1/76* (2006.01)

(52) U.S. Cl.
  CPC ........... *G10K 11/168* (2013.01); *B60R 13/0815* (2013.01); *C09J 2201/20* (2013.01); *C09J 2201/28* (2013.01); *C09J 2400/263* (2013.01); *C09J 2433/00* (2013.01); *C09J 2483/005* (2013.01); *E04B 2001/742* (2013.01); *E04B 2001/7687* (2013.01); *Y10T 156/10* (2015.01); *Y10T 156/1052* (2015.01); *Y10T 428/1476* (2015.01); *Y10T 428/24851* (2015.01)

(56) References Cited

U.S. PATENT DOCUMENTS

| | | | |
|---|---|---|---|
| 4,096,007 A | 6/1978 | Braunling | |
| 4,392,522 A | 7/1983 | Bschorr | |
| 5,128,386 A | 7/1992 | Rehmer et al. | 522/35 |
| 5,496,603 A | 3/1996 | Riedel et al. | 428/40 |
| 5,613,942 A | 3/1997 | Lucast et al. | 602/52 |
| 5,733,824 A * | 3/1998 | Brunka et al. | 442/153 |
| 5,736,470 A * | 4/1998 | Schneberger et al. | 442/151 |
| 5,741,829 A | 4/1998 | Reich et al. | 522/35 |
| 5,773,080 A | 6/1998 | Simmons et al. | 427/208.6 |
| 5,861,348 A * | 1/1999 | Kase | 442/184 |
| 5,906,883 A * | 5/1999 | Blanc-Brude | 428/178 |
| 6,390,563 B1 | 5/2002 | Haverkamp et al. | |
| 6,410,464 B1 * | 6/2002 | Menzies et al. | 442/151 |
| 6,429,154 B1 | 8/2002 | Trotter | |
| 7,867,601 B2 | 1/2011 | Ikishima et al. | |
| 8,153,219 B2 * | 4/2012 | Hooft | 428/40.1 |
| 2001/0015249 A1 | 8/2001 | Mohr | |
| 2002/0011306 A1 * | 1/2002 | Hannington et al. | 156/289 |
| 2002/0015842 A1 * | 2/2002 | Yanagiuchi | 428/343 |
| 2003/0068943 A1 | 4/2003 | Fay | |
| 2004/0238275 A1 | 12/2004 | Keller et al. | |
| 2005/0084641 A1 * | 4/2005 | Downs et al. | 428/42.3 |
| 2006/0289230 A1 | 12/2006 | Connelly et al. | |
| 2007/0190871 A1 | 8/2007 | Patel | |
| 2007/0277948 A1 | 12/2007 | Carbo et al. | |
| 2008/0050565 A1 | 2/2008 | Gross et al. | |
| 2008/0233348 A1 | 9/2008 | Ishiwatari | |
| 2009/0148644 A1 | 6/2009 | Francis | |
| 2012/0024626 A1 | 2/2012 | Coates et al. | |

FOREIGN PATENT DOCUMENTS

| | | |
|---|---|---|
| GB | 823203 | 11/1959 |
| GB | 2 079 626 A | 1/1982 |
| JP | S56-38080 A | 9/1982 |
| JP | 63-11541 | 1/1988 |
| JP | 2-302484 | 12/1990 |
| JP | 2001-348540 | 12/2001 |
| JP | 2002-52634 | 2/2002 |
| JP | 2006-104298 | 4/2006 |
| JP | 2006-143867 | 6/2006 |
| JP | 2006-273909 | 10/2006 |
| WO | 00/32142 A1 | 6/2000 |
| WO | 01/19306 A1 | 3/2001 |
| WO | 2007/125830 A1 | 8/2007 |
| WO | 2010/042995 A1 | 4/2010 |

OTHER PUBLICATIONS

Korean Office Action dated Feb. 22, 2013.
Chinese Office Action dated Feb. 4, 2013.
European Extended Search Report dated Oct. 4, 2012.
Japanese Office Action dated Oct. 15, 2013; Appln. No. JP2011-531303.
Australian Patent Examination Report No. 1, dated Oct. 22, 2013; Application No. 2009304593.
Japanse Office Action dated Jul. 8, 2014.
Extended European Search Report dated May 18, 2015; Application No. 09820114.8.

* cited by examiner

TAPE MATERIAL AND ROLL COMPRISING PRESSURE SENSITIVE ADHESIVE

TECHNICAL FIELD

The described embodiments relate to tape materials, and in particular to substrates carrying pressure sensitive adhesive substances, methods of making same and rolls of such tape materials.

BACKGROUND

Pressure sensitive adhesive (PSA) substances can be used to adhere materials to other materials, articles or surfaces, which may include other substrates. Tapes that use PSA substances can be produced in a wide range of forms, such as unsupported adhesive films known as transfer tapes, double sided tapes with a carrier film, tissue, or nonwoven material coated on one or both sides with pressure sensitive adhesives. The adhesive coating is applied to a first substrate, and this adhesive coated substrate can then be applied to a second substrate, so that the second substrate becomes adhesively coated. For example, a PSA resin can be coated onto a release liner and supplied as a roll of PSA tape.

With most PSA tapes, the resin coating covers all or almost all of the release liner. The coating may vary in thickness. Thick coatings can result in the use of a large amount of PSA resin. This amount may be well in-excess of that required to actually hold the substrate in place, resulting in unnecessary wastage and cost.

It is desired to address or ameliorate one or more shortcomings or disadvantages associated with existing PSA-carrying substrates, or to at least provide a useful alternative thereto.

SUMMARY

Some embodiments relate to a tape material comprising a thin flexible substrate and a pressure sensitive adhesive (PSA) substance carried on a single side of the substrate. The PSA substance is provided in an intermittent pattern along a length of the substrate.

The intermittent pattern may comprise PSA strips and each PSA strip may be separated from an adjacent PSA strip by a gap. The tape material may further comprise a mesh carried on the single side and the PSA strips may be disposed generally between the substrate and the mesh. The mesh may span gaps between the PSA strips and may comprise a light weight open mesh. The mesh may be formed predominantly of one of polyester and fibreglass.

The substrate may comprise one or more slits formed therein intermediate at least one pair of adjacent PSA strips. Such slits may be continuous along the length of the tape material. The PSA may be an ultra-violet light-cured acrylic PSA.

The substrate may comprise a plastic film. The plastic film may comprise a material selected from the group consisting of polyethylene, polypropylene and polyethylene teraphtalate (PET), or other polymer film. The thickness of the substrate may be about 15 microns to about 150 microns or alternatively about 20 microns to about 60 microns. Alternatively, the thickness of the substrate may be about 35 microns to about 50 microns. The substrate may comprise coated paper. The substrate may be silicone coated, preferably on both sides.

The substrate may have a release value on the single side of about 0.01 N/25 mm to about 0.4 N/25 mm. A ratio of a first release value of the single side to a second release value of an opposite side of the substrate may be from about 3:1 to about 1:1.

Other embodiments relate to rolls of tape material comprising the tape material described above and/or formed by the method or apparatus described below.

Further embodiments relate to a method of forming a tape material. The method comprises coating a pressure sensitive adhesive (PSA) substance on a single side of a thin flexible substrate, wherein the PSA substance is coated onto the substrate in an intermittent pattern along a length of the substrate.

The method may further comprise winding the substrate to form a roll of tape material. The method may further comprise curing, or cross-linking, the coated PSA substance to enhance adhesive properties of the PSA substance. The curing may comprise irradiating the coated PSA substance with ultraviolet light.

The method may further comprise forming one or more slits in the substrate along one or more portions of the substrate not coated by the PSA substance. The method may further comprise laminating a mesh onto the single sided substrate. The mesh may be laminated onto the coated PSA substance so that the PSA substance is generally disposed between the substrate and the mesh. The mesh may be laminated onto the PSA substance so that the mesh spans gaps in the intermittent pattern. The mesh may comprise a light weight open mesh and may be formed predominantly of one of polyester and fibreglass.

Some embodiments relate to a method of preparing an article, comprising:

forming the tape material (optionally as a roll) according to the method described above; and     optionally unwinding the tape material from the roll, if necessary, and pressing the tape material onto a surface of the article so that the PSA adheres to the surface.

Some embodiments relate to the method as described above, further comprising cutting the article and the tape material to form separate items, wherein the substrate is removable from the items while leaving the PSA on the items, so that each item can be adhered to a target surface using the PSA. Still further embodiments relate to an article prepared according to the methods described above.

Still other embodiments relate to apparatus for forming a tape material, comprising an applicator device and a conveying apparatus. The applicator device is configured to dispense a pressure sensitive adhesive substance onto a moving substrate in a continuous process and to apply the PSA substance in an intermittent pattern on the substrate along the length of the substrate. The conveying apparatus is configured to convey the substrate relative to the applicator device in the continuous process.

The conveying apparatus may be further configured to convey the substrate under tension. The substrate may be plastically deformable and the tension may be such that the substrate elongates slightly under the tension.

The apparatus may further comprise a cutting device for forming slits in the substrate. The cutting device may comprise at least one blade positioned to slit the substrate along one or more portions of the substrate not coated by the PSA substance.

The apparatus may further comprise a means for curing the PSA substance after it is coated on the substrate to enhance adhesive properties of the PSA substance. The PSA substance may be acrylic. The means for curing may comprise a light source for irradiating the PSA substance. The light source may comprise an ultraviolet light source.

The apparatus may further comprise a lamination device for laminating a mesh onto the PSA substance. The apparatus may further comprise a winding apparatus to wind the substrate onto a roll of tape material after the PSA substance is applied to the substrate.

BRIEF DESCRIPTION OF THE DRAWINGS

Embodiments are described in further detail below, by way of example, with reference to the accompanying drawings, in which.

DETAILED DESCRIPTION

The described embodiments relate generally to tape materials having an intermittent pattern of pressure sensitive adhesive (PSA) substance coated thereon, and to methods and apparatus for forming such tape materials and rolls of such tape materials. Referring now to FIGS. 1 to 5, embodiments of a tape material 100 are shown and described in further detail. Some embodiments also relate to items, articles or textile materials to which the tape material is applied, and to rolls of such textile materials.

As illustrated in FIGS. 1 to 5, the described embodiments generally involve applying a coating 120 of a PSA substance, such as a resin, onto a substrate 110 in an intermittent pattern. By providing gaps 125 in the coating, a person can more readily find uncoated sections that allow an edge of the substrate to be lifted easily when the coating 120 is to be peeled away to adhere to another surface or substrate of another article. The intermittent coating 120 may be applied in strips in the machine direction of the coating, for example, or in another pattern. This can be achieved by hot-melt coating with a slot die, for example, although it can also be achieved by coating with a patterned roller, for example, and may also include water and solvent based coatings, in addition to hot-melt coating.

The pressure sensitive adhesive substance may be an acrylic resin that is curable under ultraviolet light, such as AcResin type DS3583 available from BASF of Germany. Some suitable acrylic resins are described in U.S. Pat. Nos. 5,128,386 and 5,741,829. The PSA substance may be applied to substrate 110 in a thickness of about 10 to about 150 microns, for example. The thickness may alternatively be from about 20 to about 100 microns, and possibly from about 30 to about 75 microns, for example. In the case of the BASF resin DS3583, for example, the PSA substance may be heated to about 140° C. for application to substrate 110. Depending on the temperature-related behaviour of the chosen material of substrate 110, the application temperature of the PSA substance may be varied somewhat.

Other types of PSA substance, application thickness and application temperatures may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive. The PSA coating 120 may be applied as a hot-melt, water-based or solvent-based coating, for example. For UV-cured hot-melt adhesive, the adhesive can be applied at a relatively low temperature that is compatible with a relatively low melting point substrate 110. The subsequent UV curing serves to cross-link the adhesive for high temperature resistance, without overheating the substrate 110. Both water-based and solvent-based coatings generally require extensive drying and elevated temperatures under tension, which can damage a low melting point substrate 110. Such PSA coatings may be applied intermittently but are not ideal for low melting point substrates 110.

The purpose of the substrate 110 is to act as a carrier for the PSA substance so that the PSA substance can be applied (adhered) to a target article, which may comprise another substrate, and the substrate 110 can be subsequently removed by peeling it away, leaving the PSA substance exposed on the side where the substrate 110 used to be. The newly exposed face of the PSA substance can be applied to a target surface, for example, to adhere the target article to the target surface.

Depending on the size and spacing of the applied portions of the intermittent PSA coating 120, the percentage of coated area can be varied. The applied area of the coating 120 can vary between 10 and 90% of the area of the substrate 110, for example. In some embodiments, the PSA coating 120 is applied in strips, and the spacing of the strips may vary depending on the requirements of the end user of the PSA tape. A wider spacing or gap 125 between the strips can facilitate easier removal of the substrate 110.

By applying the adhesive in an intermittent pattern, such as longitudinal strips, it is possible to still achieve the coating weight desired for a particular application, while saving a large percentage of the PSA resin by coating only some portions of the total area. In particular, the described embodiments have been developed to use a reduced amount of PSA substance on lightweight and porous target articles that do not require an all-over coating.

The intermittent coating is applied to a suitable substrate 110 that acts as a release liner. The substrate 110 may include paper, coated paper, and filmic release liners. The release liner may be silicone coated; however other types and forms of release coating can also be used. For ease of reference, but by way of example only, the substrate 110 may be referred to herein as a release liner 110.

The PSA coating 120 may be provided as a water-based emulsion which is dried after coating, as a solvent-based resin, where the solvent is evaporated after coating, or as a hot-melt resin which cools after coating. The PSA tape can be wound up for later application to a substrate, or it can be laminated in-line to a surface of an article. The PSA tape can be unwound onto another substrate, or target article, such as foam, rubber, paper, films etc, which may be then die cut or otherwise transformed. The release liner 110 can then be removed from the target article, leaving the PSA substance on the target article, for the final adhesive application of the target article to another surface. For example, where the tape material 100 is applied to a sound absorbing material as the target article (which is then die-cut), once the release liner 110 is peeled away, the PSA coating 120 will be exposed for application to another surface, such as an internal area of a part of an automobile to which the sound absorbing material is to be applied. Thus, the tape material 100 acts as a transfer tape or mechanism to transfer the PSA onto an article that is desired to be adhered to something else using the PSA.

For even further ease of use, the release liner 110 can be formed to have relatively high tear strength so that it can be removed in one piece. Depending on the material used for the release liner, it may have a thickness between about 15 microns and 150 microns. The release liner 110 may comprise a polyethylene (PE), polypropylene (PP) or similar plastic film, for example. An MDPE release liner 110 may be formed of a blown extruded film and may have a thickness of about 35 to about 60 microns or about 40 to about 45 microns, for example, when used with a mesh as described below. For example, the tear strength of a 45 micron medium density polyethylene (MPDE) release liner 110 may be about 3 Newtons in the machine (production process) direction, and about 6.5 Newtons in the cross direction. Alternatively, low density (LDPE) or high density polyethylene (HDPE) films may be used as the release liner 110. HDPE release liners of about 50 micron thickness may be preferable for increased tear strength. If no mesh is used, the release liner may comprise a silicone and PE coated paper, for example, to provide more structural support for the PSA substance, and the release liner may be thicker.

A suitable release liner 110 may be selected to have a specific combination of tear strength, flexibility and release value. For example, the MDPE release liner described above may have a release value on one side of roughly 0.15N/25 mm and a release value on the second side of roughly 0.45N/25 mm, i.e. a release ratio of about 1:3. An ideal release liner 110 may have lower release values, but this can be difficult to achieve on PE films, due to the heat required to cross-link the required silicone coating systems to provide such easier release. Such silicone coatings can be applied to a heavier PE coated paper to achieve lower release values, but such paper does not have the lower weight and higher flexibility of the PE films. If a mesh is incorporated into the PSA tape, as described below, it is possible to use a release liner with a lower ratio of release between the "easy release" and the "tight release" sides of the release liner, as the mesh supports and reinforces the PSA and the release liner 110 and effectively provides some tensile strength to the release liner 110.

Paper-based release liners have a relatively high resistance to elevated temperatures and are therefore useful where the PSA coating 120 is applied or cured at higher temperatures. The temperature resistance of filmic release liners depends on the type of polymer used for the film. At the low end, LDPE has a softening point around 100° C. At the higher end, PET has a softening point of around 240° C. As the temperature resistance of a film increases, the tear strength generally decreases, so that the low temperature films generally have higher tear strength. Orientation of the film may also affect its tear strength, with highly orientated films having relatively low tear strength in the machine direction. If the tear strength of the release liner 110 is low, then the release liner 110 is more inclined to tear during release from the PSA coating 120, especially where any notch is present in the release liner 110. Higher tear strength is therefore desirable, but this can necessitate a thicker film or material as the substrate 110 and therefore may involve additional cost.

For flexibility, a soft, flexible release liner 110 is preferred when the target article to which the tape material 100 is to be applied is to be formed into a roll. If the release liner 110 is stiff, then it can cause the target article to not roll evenly and instead may cause creases and folds in the target article, particularly where the target article comprises a thick material, such as a foam or a fibrous web. Such creases and folds can affect the evenness of the adhesion of the tape material to the target article and can adversely affect the visual appearance and adhesive capacity of the target article when it is unrolled.

Some hot-melt adhesive systems have relatively low temperature resistance. Those with higher temperature resistance must be applied at higher temperatures, often higher than the melting point of the release liner 110 (if plastic is used). For this reason, a polyester (polyethylene teraphthalate, PET) release liner 110 may be used as the PET melting points are well over 220C.

A radiation-curable hot-melt PSA adhesive may be applied to the release liner 110 at temperatures around 140C, and may then be cross-linked by exposure to ultra-violet (UV) light after coating onto the release liner 110. In this case, it is possible to use a low melting point film, such as MDPE, as the release liner 110 as it also tends to exhibit higher tear strength (i.e. higher resistance to tearing).

Additionally, because the application of the coating 120 is discontinuous, the actual coating weight added is lower than it would be for 100% coverage, reducing the actual heat exposure and minimizing heat distortion of a heat sensitive release film, such as PE release film. The UV-curing process does not add additional heat into the system.

One disadvantage of material backed with conventional PSA tapes is that it can be difficult to initiate manual separation of the release liner from a cut edge. This deficiency can result in end-user dissatisfaction with such PSA tapes due to the additional time taken to expose the pressure sensitive adhesive for use.

As a further aid to easy removal of the release liner, the release liner 110 may have one or more slits 115 formed therein. This can be achieved in a number of ways, although in one example, the release liner 110 is slit by a stationary knife positioned prior to the rewinding process. The slits 115 are selected to be made on an uncoated section, so that the knife does not accumulate adhesive resin and so that portions of the release liner 110 adjacent where it is slit are uncoated. The number of slits 115 can be varied as required.

According to some embodiments, the PSA coating 120 may be stabilised by a light weight, open mesh 130 of polyester or fibreglass, or other suitable textile or plastic material. In one example, the mesh is formed of polyester strands coated with a thermoplastic resin. The mesh may have about 78 Denier and a density of about 2.88 g/m$^2$, with a rectangular mesh spacing of about 8 mm by 12 mm. A suitable mesh may be obtained from Saint Gobain of Grand Island, N.Y. under product code KPM3210/P3A-3L. Alternatively, a mesh with more strands (and hence increased strength) in the warp direction (as compared to the weft direction) may be used to improve support and release of the PSA in the transverse direction. It is desirable for at least one warp strand (and preferably multiple strands) of the mesh to coincide and align with each of the PSA strips extending in the longitudinal direction. Thus, the warp and weft of the mesh may be generally aligned with the machine and cross-directions, respectively.

The type, size and shape of the mesh may be varied, for example to have a more closed form (i.e. woven at smaller spacing in the warp or weft directions) to provide more support for the PSA coating 120. One particular function of the mesh is to provide sufficient reinforcing strength to the PSA coating 120 so that it can be easily removed from substrate 110. If the mesh is more open (i.e. woven at a greater spacing in a warp or weft directions), the risk that the PSA coating 120 will break increases and can make removal of the release liner 110 more difficult.

The mesh 130 may be laminated onto the intermittent PSA after slits 115 (if any) are formed in the release liner 110, but prior to rewinding the adhesive tape, and can become relatively integral with or embedded into the adhesive coating 120. The mesh 130 may also serve to hold the intermittently coated and slit release liner 110 together, for ease of handling, as well as holding the intermittent PSA coating 120 together after the release liner 110 is removed.

When applied to porous target articles, such as fibrous webs, relatively narrow strips of pressure sensitive adhesive coating 120 may tend to lift off the porous articles during removal of the release liner 110. The laminated mesh 130 can help to mitigate this problem.

In embodiments employing a mesh 130, because the individual strips of PSA substance will be supported by the mesh 130 when wound into a roll, it is possible to slit the release film at pre-determined locations along the cross direction before rewinding. These slits 115 effectively provide an additional edge length to the release liner 110, allowing a user to more readily find an edge from which to manually initiate liner removal.

Figure 8:
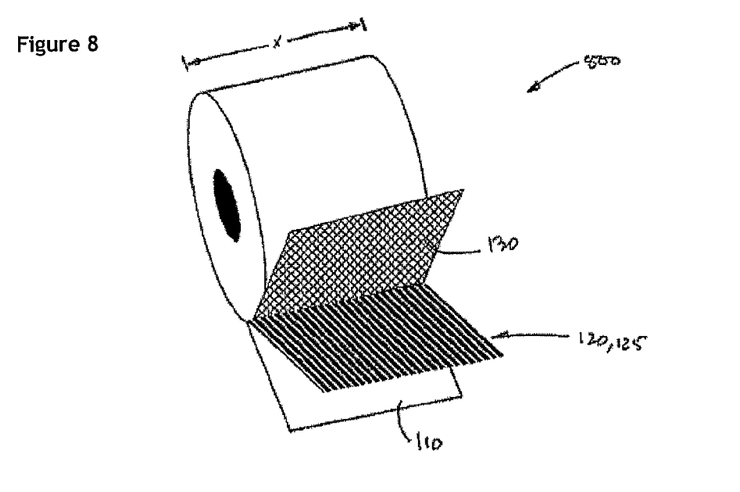
FIG. 8 is a schematic representation of a roll of tape material carrying a PSA substance.
Figure 10:
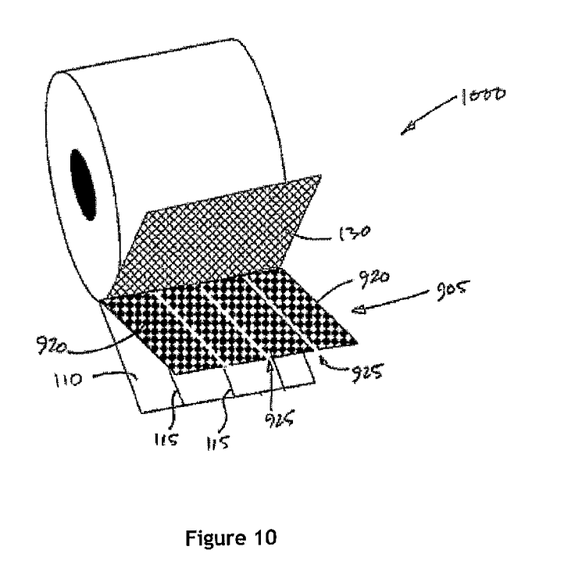
FIG. 10 is a schematic representation of a roll of tape material having the intermittent coating of FIG. 9 applied thereto.

The material composition of the substrate and any coatings applied thereto may be selected to achieve a specific ratio of release values between the side on which the PSA is coated and the opposite side of the release liner 110. Some embodiments may have a ratio of about 3:1 between the release value of the PSA-coated side and the release value of the opposite (non-PSA coated) side, so that when the tape material 100 is formed into a roll 800 or 1000, the PSA substance peels away more easily from the non-coated surface of the adjacent winding layer of the roll, without peeling away from the release liner 110 to which it was originally applied. Such unequal release values from one side of a substrate to another can be referred to as differential release values. For such differential release values, ratios other than about 3:1 may be employed, for example around 2.5:1, 2:1 or 1.5:1. In fact, the differential release values may be as high as nearly 10:1, depending on the materials used. However, for ease of release of the PSA substance from the substrate 110, particularly in the direction transverse to the longitudinal orientation of the strips, differential release values closer to 1:1 are preferred.

For release values that have a ratio of closer to 1:1, it is considered that the mesh 130 is needed in order to lend adequate integrity to the PSA applied to the substrate 110 to allow the tape to be unwound and applied to another article. For the greater differential release values described above, the mesh may not be needed.

The specific release values for each side of the substrate 110 can affect the ability to unwind the tape material from roll 800 or 1000. It has been found that release values significantly greater than about 0.45 N/25 mm can result in a more difficult separation of the release liner 110 from the PSA than would be desirable. Thus, release values of between about 0.01 N/25 mm and about 0.4 N/25 mm are considered to be effective. More preferable would be release values on the PSA coated side of the substrate 110 of about 0.01 N/25 mm to about 0.1 N/25 mm. A release value of 0.06 N/25 mm on the PSA-coated side has been found to be effective in some instances.

Figure 1:
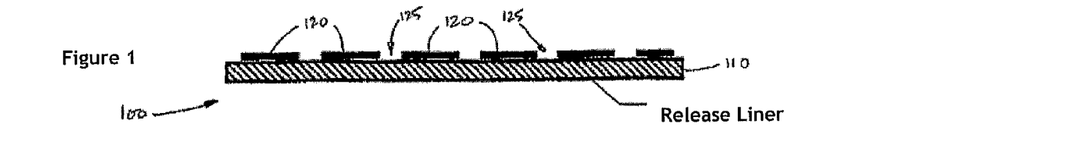
FIG. 1 is a schematic cross-sectional view of one form of tape material carrying a PSA substance.
Figure 2:
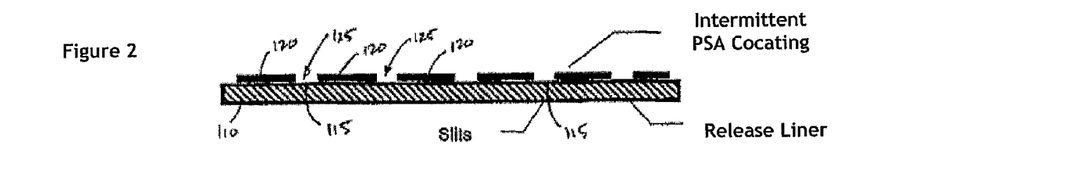
FIG. 2 is a schematic end cross-sectional view of another form of tape material carrying a PSA substance.
Figure 3:
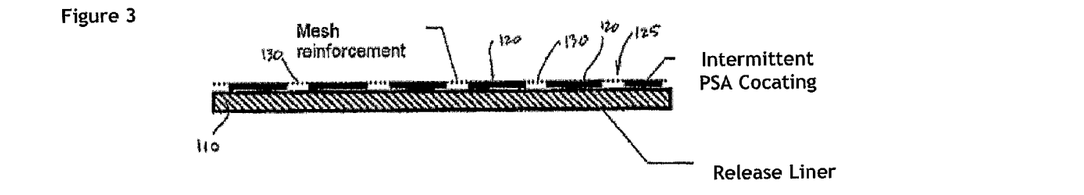
FIG. 3 is a schematic end cross-sectional view of another form of tape material carrying a PSA substance.
Figure 4:
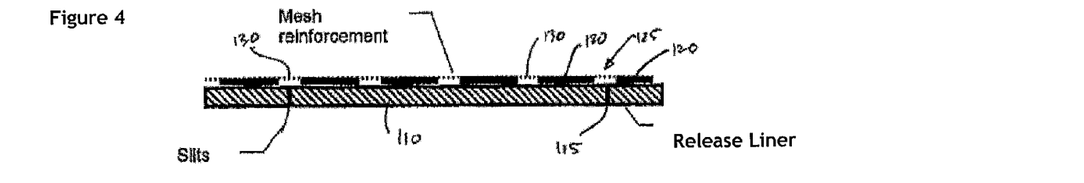
FIG. 4 is a schematic end cross-sectional view of another form of tape material carrying a PSA substance.
Figure 5:
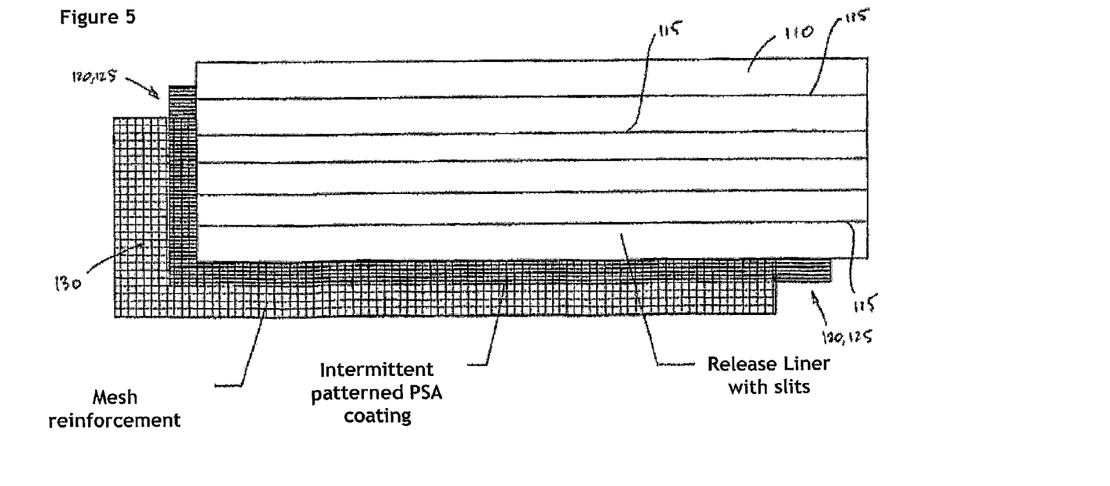
FIG. 5 is an exploded plan view of the tape material of FIG. 4.
Figure 6:
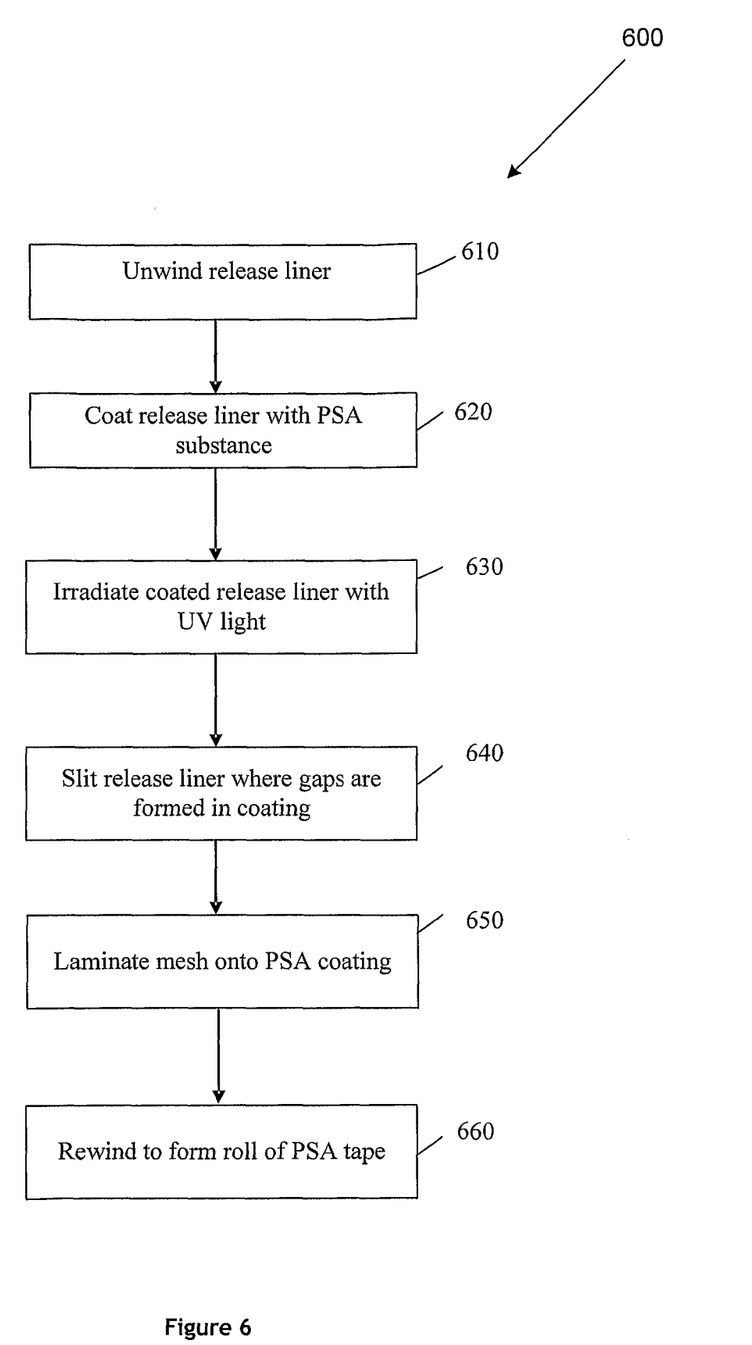
FIG. 6 is a flowchart of a method of producing a tape material.
Figure 7:
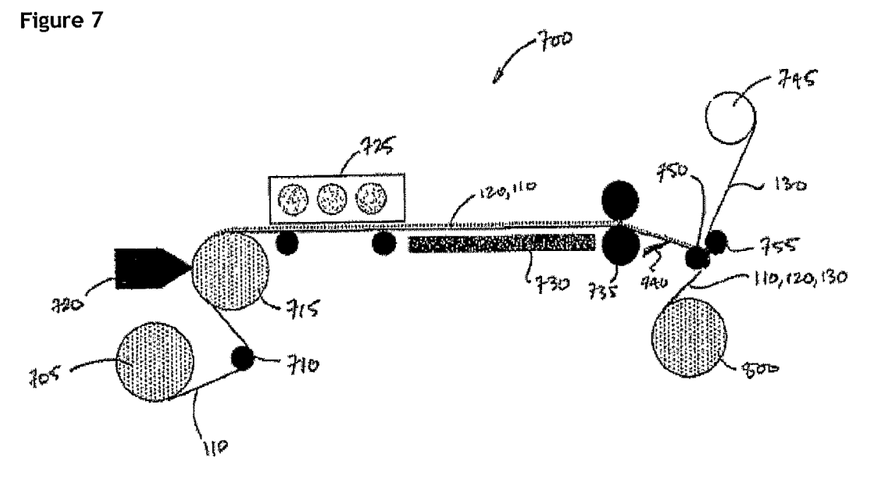
FIG. 7 is a schematic diagram of apparatus for producing a tape material.

Referring now to FIGS. 6 and 7, a process 600 and apparatus 700 for forming a tape material 100 comprising a PSA coated substrate is described in further detail. At step 610, the release liner 110 is unwound from a roll 705 of suitable plastic film or coated paper. The release liner 110 is passed around a tensioning roller 710 before being passed across a roller 715. As the release liner passes across roller 715, the side of the release liner that is to be coated with the PSA substance 120 is exposed to a PSA applicator device or apparatus 720 for coating of the release liner at step 620.

Figure 9:
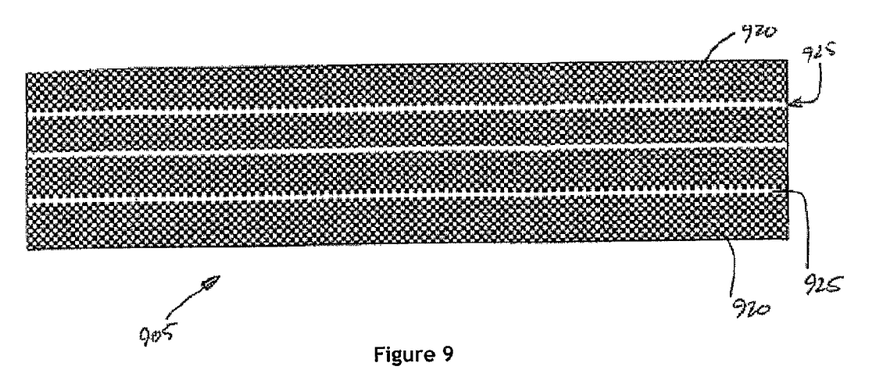
FIG. 9 is a plan view of one form of intermittent PSA coating pattern on a substrate.

Coating of the release liner at step 620 can be controlled by solenoid actuators, for example, comprised in applicator device 720, to selectively apply a thin PSA substance, such as a suitable resin, in an intermittent pattern on the exposed face of the release liner 110 as it passes across roller 715. Although it is considered that long parallel strips of the coating 120 work well, the coating 120 may be provided on the release liner 110 by applicator device 120 in a different intermittent pattern, such as a checked or alternating pattern, for example as illustrated in FIG. 9. Alternatively, if long parallel strips are applied as coating 120, the strips may not be entirely continuous. That is, the strips may have intermittent gaps along their length to further reduce the amount of PSA coating that needs to be applied to release liner 110.

The strips of PSA coating 120 may have a narrower width, a wider width or the same width as the gaps in between the strips. In one example, the width of the PSA strips may be about 8 mm and they may be separated by a twelve millimeter gap between strips, giving a PSA coating 120 over about 40% of substrate 110. Other strip and gap widths may be used, depending on the specific application of the tape material.

After the release liner 110 is coated at step 620, the coated release liner 110 is irradiated with ultra violet light at step 630 by passing it under an ultraviolet (UV) light source 725, such as a UV oven, to cure the PSA coating 120 so that it has selected adhesive characteristics. For example, UV-C exposure of between about 0.05 and about 4 Joules/cm$^2$ may be applied to cure PSA coating 120. Alternatively, the dosage may be between about 0.1 and about 2.0 Joules/cm$^2$ and possibly between about 0.2 and about 1.5 Joules/cm$^2$. Depending on the desired adhesion characteristics of the PSA coating 120, the UV light source 725 may be controlled to transmit a higher or lower power or intensity. The UV light source 725 may comprise multiple UV light sources arranged in an array of such light sources.

As an optional step (not shown in FIG. 6) following the irradiation of step 630, the release liner 110 and cured PSA coating 120 may be cooled by passing it over or through a cooling device 730. The release liner 110 and cured PSA coating 120 may then be passed over a tensioning roller 735 before being slit by a cutting device at step 640. The cutting device 640 may comprise one or more blades arranged laterally across the width of the release liner so as to form slits extending along the length of the release liner as it passes across cutting device 740. The one or more knives of cutting device 740 are selectively postionable so that the slits are formed in the release liner to coincide with gaps between the PSA coating 120. Depending upon the specific coating pattern applied to the release liner, the blades of cutting device 740 may be selectively withdrawn to avoid cutting through a portion of the release liner 110 that has the PSA coating 120 applied thereto.

At step 650, the slit release liner carrying the cured PSA coating 120 is passed over a further tensioning roller 750. Simultaneously, mesh 130 is laminated to the PSA coating 120 by application of a further appropriately positioned roller 755 or other lamination device that receives the mesh 130 from a spool or roll 745 of mesh. The combined slit release liner 110, PSA coating 120 and mesh 130 is then wound at step 660 using a suitable motorized winding apparatus or device (not shown) to form a roll of PSA tape 800, as shown in FIG. 8. As shown in FIG. 8, the lateral width, x, of the roll 800 (or 1000) may be around 1.5 m to about 1.0 m. Where necessary, multiple rolls 800 or 1000 can be arranged laterally adjacent each other to adhere the tape to an article in widths greater than about 1.5 m.

In alternative embodiments, the mesh 130 may be applied to the release liner 110 in a separate step prior to the PSA substance being coated on to release liner 110. In such embodiments, the mesh 130 is effectively adhered to the release liner by the PSA coating 120. For such embodiments, the release liner 110 is not slit at step 640 as this would likely result in the mesh being slit also, which is undesirable as the mesh 130 is helpful to keep the strips of PSA together.

As shown in FIG. 9, the PSA coating 120 need not necessarily be applied in uninterrupted strips or lines along the length of the substrate 110. FIG. 9 illustrates an intermittent coating pattern 905 having strips 920 formed of a chequered pattern and separated by gaps 925. The chequered pattern may be achieved by control of an array of solenoid valves to selectively apply and interrupt application of the PSA substance to substrate 110 by applicator device 720. Although production of the intermittent pattern 905 requires more sophistication and control of applicator device 720, such a pattern potentially further reduces the amount of PSA substance applied to the substrate 110.

If apparatus 600 and method 700 are employed to coat substrate 110 with a PSA substance in the chequered intermittent pattern 905, a roll 1000 of tape material (shown in FIG. 10) is produced that is otherwise the same as roll 800, except for the pattern of the PSA coating 120.

Although not shown in FIG. 6, apparatus 600 includes suitable drive mechanisms to convey substrate 110 at about 30 meters/minute through the apparatus 600 in the described manner in a continuous process until the roll of substrate 110 runs out and the roll of tape material 800 or 1000 is formed.

The line speed at which substrate 110 is conveyed through apparatus 600 depends on the configured UV dosage to be applied in the curing step 630, which in turn depends on the desired adhesion properties of the PSA coating 120. If the UV light source 725 is configured to provide a higher UV dosage per unit of time, the line speed can be increased. Another possibly limiting factor on the line speed is the rate at which the PSA substance is applied to the substrate 110 at step 620. Depending on various factors, the line speed may be between about 5 meters/minute and about 80 meters/minute.

During process 600, the release liner is kept under tension. This tension can be selectively applied so that the release liner (if plastically deformable) elongates slightly under the tension so that, after the release liner is slit and the tension is released, the release liner longitudinally retracts slightly to return to its natural shape. The longitudinal retraction generally involves a slight increase in lateral width, with the result that portions of the release liner that were slit may slightly overlie each other after being wound onto roll 800 or 1000. The slight overlapping of the release liner where it was slit provides increased ease of manual grasping of the release liner to pull it away from the PSA coating following application of the PSA tape to a target article.

Figure 11:
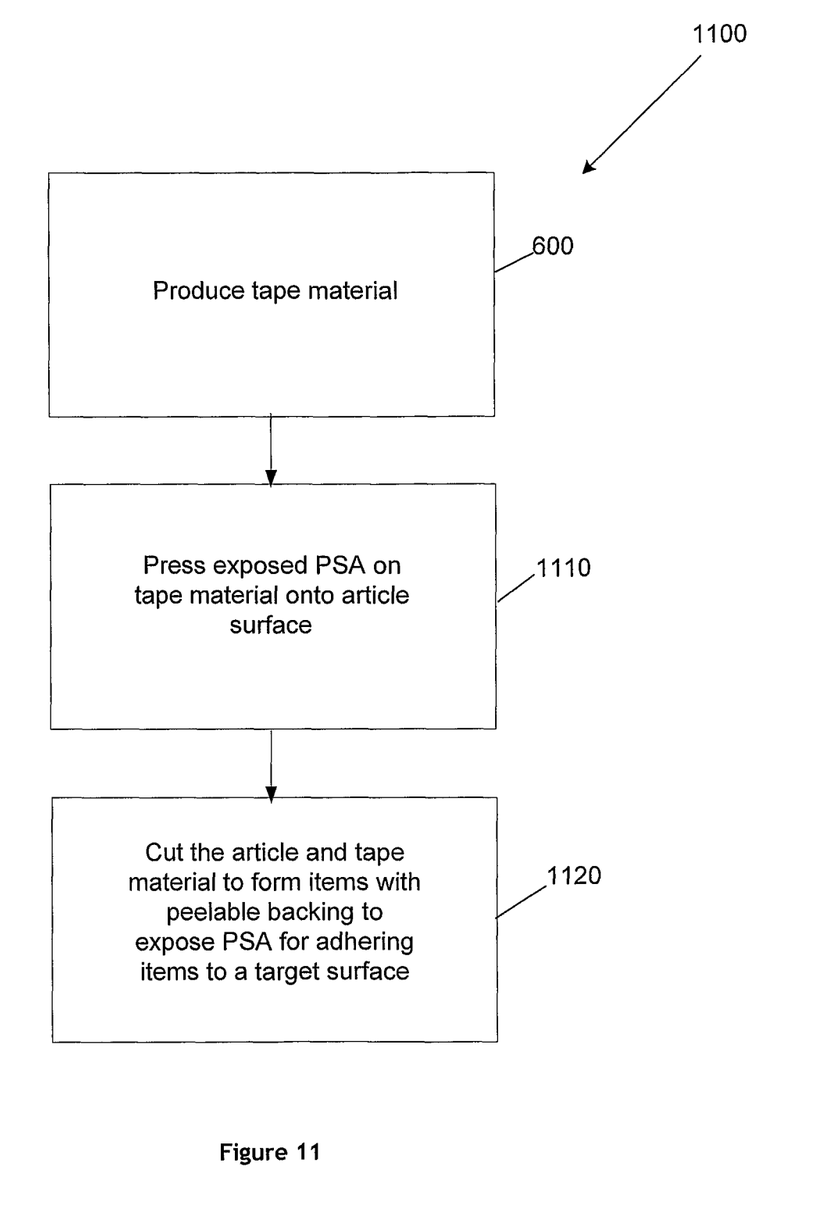
FIG. 11 is a flow chart of a method of preparing an article.

FIG. 11 is a flow chart of a method 1100 of preparing an article formed according to the method 600 described above. Method 1100 may involve receiving a roll 800 or 1000 of tape material as the output of method 600, or in some embodiments, the tape material may be formed as sheets or as a continuously produced material (i.e. applied directly without winding it into a tape roll). At step 1110, the tape material is pressed onto an article surface so that the exposed PSA on one side of the tape material 100 adheres to the article surface. Step 1110 may involve unwinding the tape material from a roll 800 or 100, if necessary. The pressing of the exposed PSA onto the article surface may be facilitated by a roller, for example where the article comprises a material produced continuously from the production line, such as a fibrous web.

Once the tape material 100 is applied to the article surface at step 1110, the article and tape material may be rewound into a roll for transport, if appropriate, or the article may be further processed, as desired. For example, at step 1120, the article may be cut to form a number of items that have the tape material 100 on one or more sides thereof. With the tape material 100 comprising a part of each item, the item effectively has a peelable backing liner than can be peeled off manually to expose PSA for adhering the item to a target surface. For example, where the tape material is applied to a fibrous web that acts as a sound absorption material, the material can be cut into panels, optionally thermoformed, and the release liner 110 can be peeled away so that the panels can be applied to the part of the vehicle.

In summary, the described embodiments involve one or more of:
An intermittent patterned PSA coating 120 that reduces the amount of resin used.
A PSA tape that uses a low amount of adhesive for a particular application.
Easy substrate removal by virtue of the gaps in the intermittent coating, effectively providing an extended "finger lift" edge at each gap.
Easy substrate removal by virtue of slits 115 in the substrate 110 effectively providing an extended "finger lift" edge at each slit 115.
Easy substrate removal by virtue of a certain tear resistance of the plastic substrate 110.
A stabilised slit PSA tape, by virtue of the mesh incorporated into the tape to provide stability.
A cross-linked PSA tape, with adhesive properties determined by UV-dosage, and in particular with high temperature resistance.

Some embodiments therefore relate to a practical high performance PSA tape that features an intermittent or discontinuous coating with physical properties enhanced by the insertion of the reinforcing mesh. The release liner may comprise a thin PE, PP, or PET film that is relatively tear-resistant and can be recycled. With the optional slit release film, the usability is greatly enhanced.

Embodiments have been described herein with reference to the figures. However, some modifications to the described embodiments may be made without departing from the spirit and scope of the described embodiments. Accordingly, the described embodiments are intended to be non-limiting with respect to any appended claims.

The invention claimed is:

1. A tape material comprising: a thin flexible substrate with high tear strength, and a pressure sensitive adhesive (PSA) substance parried on a single side of the substrate, the PSA substance being provided in an intermittent pattern along a length of the substrate; and a laminated mesh carded on the single side, wherein the mesh is open to expose the PSA substance for adhesion.

2. The tape material of claim 1, wherein the intermittent pattern comprises PSA strips and each PSA strip is separated from an adjacent PSA strip by a linear gap.

3. The tape material of claim 2, wherein the PSA strips are disposed generally between the substrate and the mesh.

4. The tape material of claim 2, wherein the mesh is disposed generally between the PSA strips and the substrate.

5. The tape material of claim 2, wherein the substrate comprises one or more slits formed therein intermediate at least one pair of adjacent PSA strips to aid in removal of the substrate.

6. The tape material of claim 1, wherein the mesh is formed predominantly of one of polyester and fibreglass.

7. The tape material of claim 1, wherein the PSA is an ultra-violet light-cured acrylic PSA.

8. The tape material of claim 1, wherein the substrate comprises a plastic film release liner, wherein the plastic film comprises a material selected from the group consisting of: polyethylene, polypropylene and polyethylene terephthalate.

9. The tape material of claim 8, wherein the thickness of the substrata is about 15 microns to about 150 microns.

10. The tape material of claim 1, wherein the substrate comprises a paper-based release liner.

11. The tape material of claim 1, wherein the substrate is silicone coated.

12. The tape material of claim 1, wherein the substrate has a release value on the single side of about 0.01 N/25 mm to about 0.4 N125 mm.

13. The tape material of claim 1, wherein a ratio of a first release value of the single side to a second release value of an opposite side of the substrate is from about 3:1 to about 1:1.

14. A tape material comprising:
    a thin flexible substrate having a thickness of from about 15 microns to about 150 microns with high tear strength, and a UV, light-cured, pressure sensitive adhesive (PSA) substance carried on a single side of the substrate, the PSA substance being provided in an intermittent pattern comprising PSA stripe disposed:
    i. along a length of the substrate; and
    ii. in between one or more sifts formed in the substrate;
    wherein each PSA strip is separated from an adjacent PSA strip by a linear gap; and
    a laminated polyester mesh carried on the single side, wherein the mesh is open to expose the PSA substance for adhesion and the PSA strips are disposed between the substrate and the mesh.

* * * * *